Sept. 20, 1966   R. A. KOFFINKE   3,273,789
SOLID BOWL CENTRIFUGE WITH AIR CIRCULATION CONTROL
Filed May 22, 1963   3 Sheets-Sheet 3

United States Patent Office 3,273,789
Patented Sept. 20, 1966

3,273,789
SOLID BOWL CENTRIFUGE WITH AIR CIRCULATION CONTROL
Richard A. Koffinke, Walpole, Mass., assignor to Bird Machine Company, South Walpole, Mass., a corporation of Massachusetts
Filed May 22, 1963, Ser. No. 282,354
11 Claims. (Cl. 233—7)

This invention relates to a centrifugal separator and more particularly to a centrifuge having a rotating solid-walled bowl and an internal conveyor for separating solids from liquid in a slurry fed to the bowl. Such centrifugal separators are used in dewatering slurries to obtain a high yield of solids with small moisture content in the cake discharge, or to achieve high clarification of liquids with small quantities of entrained solids in the effluent discharge, or to get both high solids yield and high clarification at the same time from the feed slurry. Some advantages of solid bowl centrifuges over those using screens or filters are that there are practically no limits as to the smallest size of particles which may be separated from the liquid, and that the solids or cake discharge may have an extremely low moisture content, being in some cases "dry" in a commercially acceptable sense.

However, even solid bowl centrifuges perform inconsistently in some situations and under certain conditions. For instance, when the outlets for either or both the effluent discharge or cake discharge are restricted in any way, there may be a spill-over of unwanted liquid into the cake (solids) discharge chute, or there may be a pickup of fine dry solids in the air circulating in the centrifuge and redepositing of such solids in the effluent (liquids) discharge line. Spill-over of liquid into the solids and pickup of solids in the liquid discharge can occur:

(1) When the entire centrifuge is used in a completely sealed environment, with natural or artificial internal atmosphere, either pressurized or unpressurized. Such a sealed environment is provided where contaminants in the slurry or in the separated liquids and solids discharge must be avoided, where escape of noxious or hazardous vapors from the centrifuge would be dangerous, or when a combination of high temperature and low vapor pressure materials is involved in the process.

(2) When the effluent discharge or solids discharge is directed into a closed or restricted hopper or container to prevent contamination of the discharge or reaction of the surrounding atmosphere with the discharge.

In analyzing the problem of spill-over of unwanted liquid into the solids discharge, at first it seemed possible to cure it by changes in the rate of speed of rotation of the centrifuge or by changes in the rate of feed of slurry to the machine, or by a combination of changes in rotary speed and rate of slurry feed. Up to a certain point this seemed to work, but even this was not always enough, and the production rate changes due to the slurry feed changes were undesirable. Furthermore, when excess gas was introduced into the solids discharge line, these expedients were not always helpful in curing the difficulty of redeposited solids in the effluent discharge line. Therefore, other approaches were sought, and the principal object of this invention is to provide an arrangement which, in a centrifuge of the character described, will prevent the spill-over of unwanted liquid in the solids discharge and the pickup of solids in the liquids discharge. It is thus an object of this invention to improve the efficiency of operation of a continuous centrifuge.

The present invention eliminates the undesirable liquid spill-over effect by changing or redirecting the circulation of gas within the centrifuge itself, connecting the atmosphere in a region of comparativley high pressure near the liquids discharge end with the atmosphere in a region of relatively lower pressure near the solids discharge end. This connection is made by a pipe or passageway acting as a gas recirculating line or atmospheric by-pass and may be built in as a permanent part of the centrifuge or added to existing machines when it is desired to use the invention.

In centrifugal separators of the character here involved, the high speed of the rotating elements causes them to operate as a centrifugal fan or pump for gas or air in the casing. Herein, the words "gas" and "air" are used interchangeably to include atmospheric air, process vapors, or added gaseous or aeriform fluid in the separator, unless a different meaning is obvious from the context. A necessary source for gas or air being pumped within the casing is usually found at the open ends of the centrifuge, but when an air source is blocked, for example as by closing the solids discharge end, it is theorized that the source air needed comes from within the centrifuge near the effluent discharge end, passing directly around the outer diameter of the bowl and along it to the solids discharge end, carrying liquid with the gas. The recirculation passage or by-pass of the present invention provides a source for the air needed for recirculation in the centrifuge, without the undesired liquid. In any event, and whatever the principle or theory of operation, it has been found that, by connecting a gas line from a substantially liquid free area in the effluent discharge passage, near the collection chamber for the liquid, and extending this line to an air space in the outer casing of the centrifuge outside of the rotary bowl but near the solids discharge end, the carry-over of liquid into the solids or cake discharge or the pickup of solids in the liquid discharge can be prevented. The efficiency of a centrifuge according to this invention may be further increased by providing an air circulation barrier in the form of a ring on the solids conveyor extending into the pool or liquid annulus in the centrifuge rotor near the effluent discharge end of the rotor.

Incidental objects and further details of that which is believed to be novel and included in this invention will be clear from the description and claims following, taken with the accompanying drawings in which are illustrated three examples of a solid bowl continuous centrifuge embodying the present invention and incorporating internal air circulation control in accordance therewith.

Figure 1:
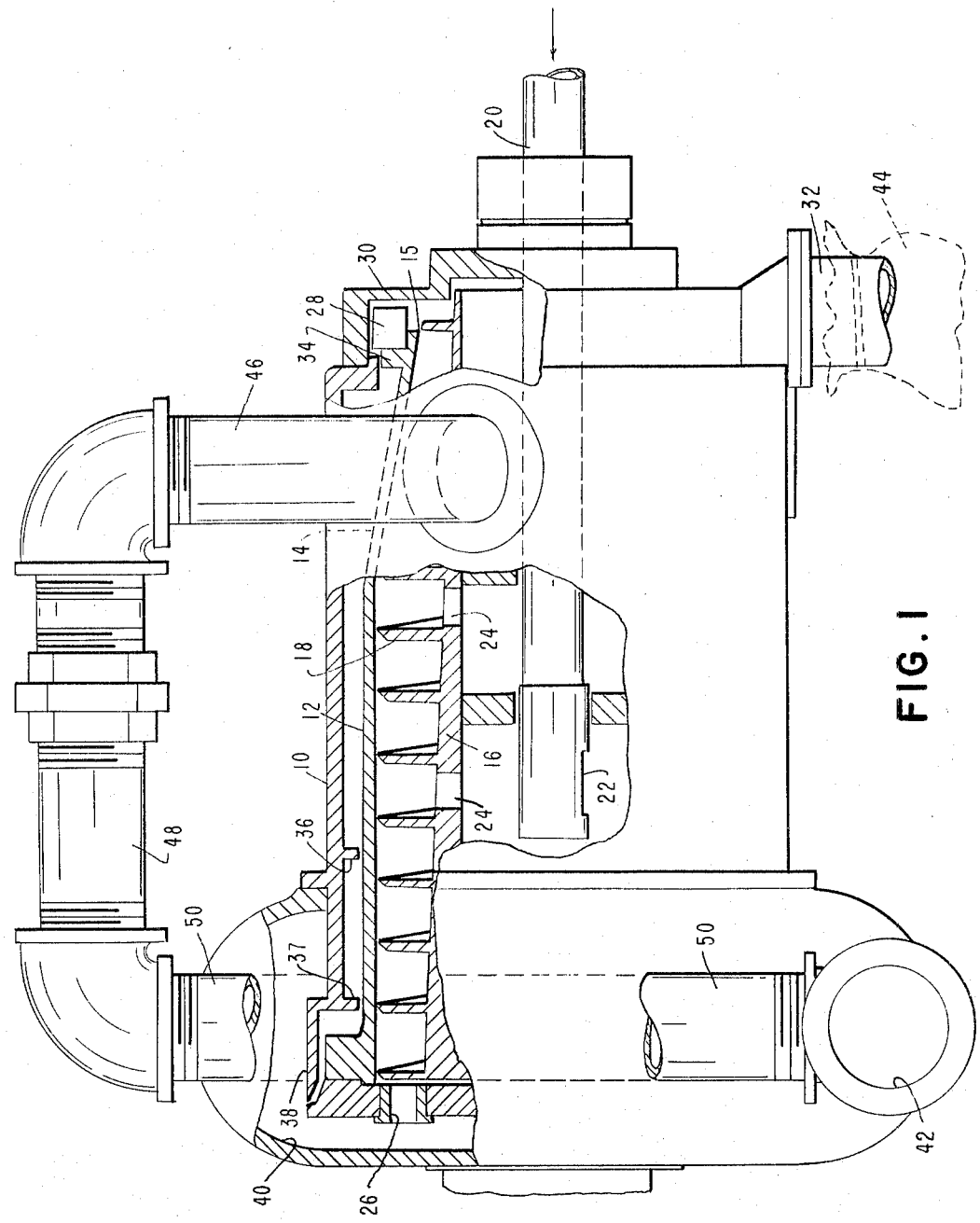
FIG. 1 is a side view, partly in section, of an exemplary centrifuge shown somewhat diagrammatically and indicating a preferred air circulation control arrangement according to the invention.

A solid bowl continuous centrifuge of the type to which this invention is applied consists essentially of two concentric rotating elements surrounded by a stationary housing 10. The outer rotating element is a solid wall bowl 12, tapering inwardly as at 14 or otherwise so shaped at one end that the solids will discharge from a smaller radius than the liquid, through an opening having an edge or lip 15. The inner element is a hollow hub screw conveyor 16 with helical blades 18 having tips shaped to fit closely to the inner contour of the solid bowl element.

Feed slurry is introduced within the conveyor hub through a fixed slurry feed pipe 20 having a feed opening 22 therein near its inner end within the conveyor hub. Slurry introduced within the conveyor hub by pump or gravity flow through the stationary pipe 20 passes by gravity and centrifugally through ports 24 in the conveyor hub, passing to the outside of the conveyor where it is flung against the inner wall of the rotating solid bowl and forms a liquid annulus or pool. Appropriate gear units or other driving arrangements (not shown) spin both the bowl and the conveyor at high rates of speed about their central axes. However, the driving arrangement is designed to maintain a slight, constant differential of speed between the bowl and conveyor so that solids, which have settled through the liquid annulus in the bowl and compacted against the bowl wall as a result of centrifugal force, are conveyed slowly but continuously toward one end of the bowl and discharged as a cake product or particles over the lip 15 of the opening at that end. Clarified liquid discharges continuously from the other end of the bowl over weirs 26 arranged radially of the rotating bowl at a distance greater than the radius of the solids discharge edge 15. The weirs may be adjustable to change the depth of the annular liquid pool. In a solid bowl centrifuge the separation is accomplished entirely by centrifugal sedimentation and no filter medium or screen needs to be cleaned or replaced.

At the solids discharge end of the machine, shown here throughout as the right-hand end of the side or longitudinal views in the drawings, a number of plows or impellers in the form of small blades or plates 28 fastened at spaced intervals around the outside end of the bowl next to the edge 15, will spin closely within a solids collection chamber 30 which forms one end of the outer housing. This collection chamber, which may be in the shape of a volute, surrounds this end of the bowl and is in communication therewith and is provided with an outlet chute 32 for reception of solids separated by the bowl and flung outwardly by the plows. A baffle ring 34 on the bowl, or on the housing at that end of the centrifuge, provides a fairly close running fit between the outside of the bowl and the inside of the housing to impede the creeping of liquid or solids past that point as the bowl is rotated. However, because of the high speed of rotation of the bowl, this baffle can not be airtight.

A somewhat similar close running baffle ring 36 on the housing near the other end serves a similar purpose in impeding undesired passage of liquids or solids in one direction or the other past that point. Further baffles or deflectors 37 and 38 may be provided around the bowl in or adjacent to the liquid collection chamber 40 or volute at the end of the housing where it surrounds and communicates with the liquid discharge end of the bowl. If secured to the rotating bowl, such baffle rings also serve to throw off any liquid or solid collected thereon.

Because the radial distance or discharge depth of the weirs 26 is greater than the radius of the reduced solids discharge end 15 of the bowl, centrifugally separated liquid in the annular pool will spill over the weirs into the liquid collection chamber 40 before it reaches the level of the solids discharge. Thereafter the liquid collected in the collection chamber is drawn off by gravity through a liquid discharge passage or pipe 42 to a convenient location for disposal or reuse, as desired.

Figure 3:
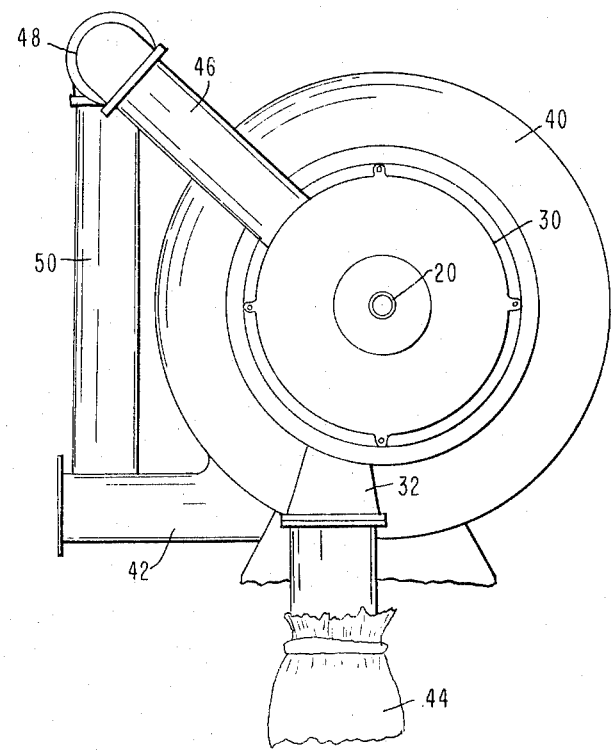
FIG. 3 is an end elevational view of the centrifuge of FIG. 1, as if taken from the solids or cake discharge end.

As above explained, this arrangement is eminently satisfactory for the liquid-solid separation of slurries under many conditions. It is not unusual for a separator of this type to be driven at speeds between 750 and 6,000 r.p.m., depending upon the particular separation problem encountered, and the diameter of the bowl. However, certain conditions of operation of a solid bowl centrifuge cause an undesirable amount of liquid to be present in the solids or cake discharge. One such condition is shown in FIG. 3 where a solids collection bag 44 is secured in gas tight relation around the solids outlet chute or pipe 32. In a solid-wall bowl centrifuge of type here involved, because the liquid discharge level over the weirs 26 at one end is always at a greater radial distance from the axis of rotation than the radial distance of the solids discharge over the edge 15 at the other end of the bowl, the diameter of the bowl at the liquid discharge end is naturally larger than the diameter at the solids discharge end. When operating, this difference in diameters induces a larger pumping or fan action within the housing at the liquid outlet end than at the solids outlet end, with a consequent differential of internal air pressure as between the two points. Because the casing or housing is closed, the differentials in pressure cause internal flow of atmosphere along the length of the apparatus. Closing of one or the other of the outlets of the centrifuge will change the normal air flow. It is believed that this is the cause of the problems discussed above.

According to a preferred form of the present invention, therefore, a venting or air circulation pipe 46 is connected to the casing or housing 10 at a point between the baffle ring 34 and the baffle 36 so that a source of air for internal circulation is provided close to the solids end when the air from the outlet 32 is closed off by the collection bag 44. The venting pipe 46 must not open to free air if the centrifuge is to be completely sealed or when problems of possible contamination of solids or liquids are encountered, and therefore the vent pipe is raised above the level of the outside of the housing as at 48 and extended to the other end of the centrifuge over the liquid discharge pipe 42, where a vertical drop 50 is made, connected to the liquid discharge 42. Because the pipe 42 in FIGS. 1, 2 and 3 extends horizontally and air or atmosphere exists above the level of liquid in the discharge pipe, substantially liquid-free air will proceed from the top of pipe 42, through the vertical pipe section 50, across the section 48, and be discharged at the other end of the venting pipe 46 into the space between the bowl and the outer casing or housing at a point remote from the liquid collection chamber 40. This effectively supplies a source of air for circulation within the housing to take the place of air which cannot come from the blocked outlet opening 32 and at the same time it does not require a supply of air or atmosphere from outside the system. As just described, the equipment is as shown in FIGS. 1 and 3 of the drawings. The flow of air will be in the direction described because of the pressure differentials due to the design of the equipment and the fact that the rotary parts will act as pumps or fans.

Figure 2:
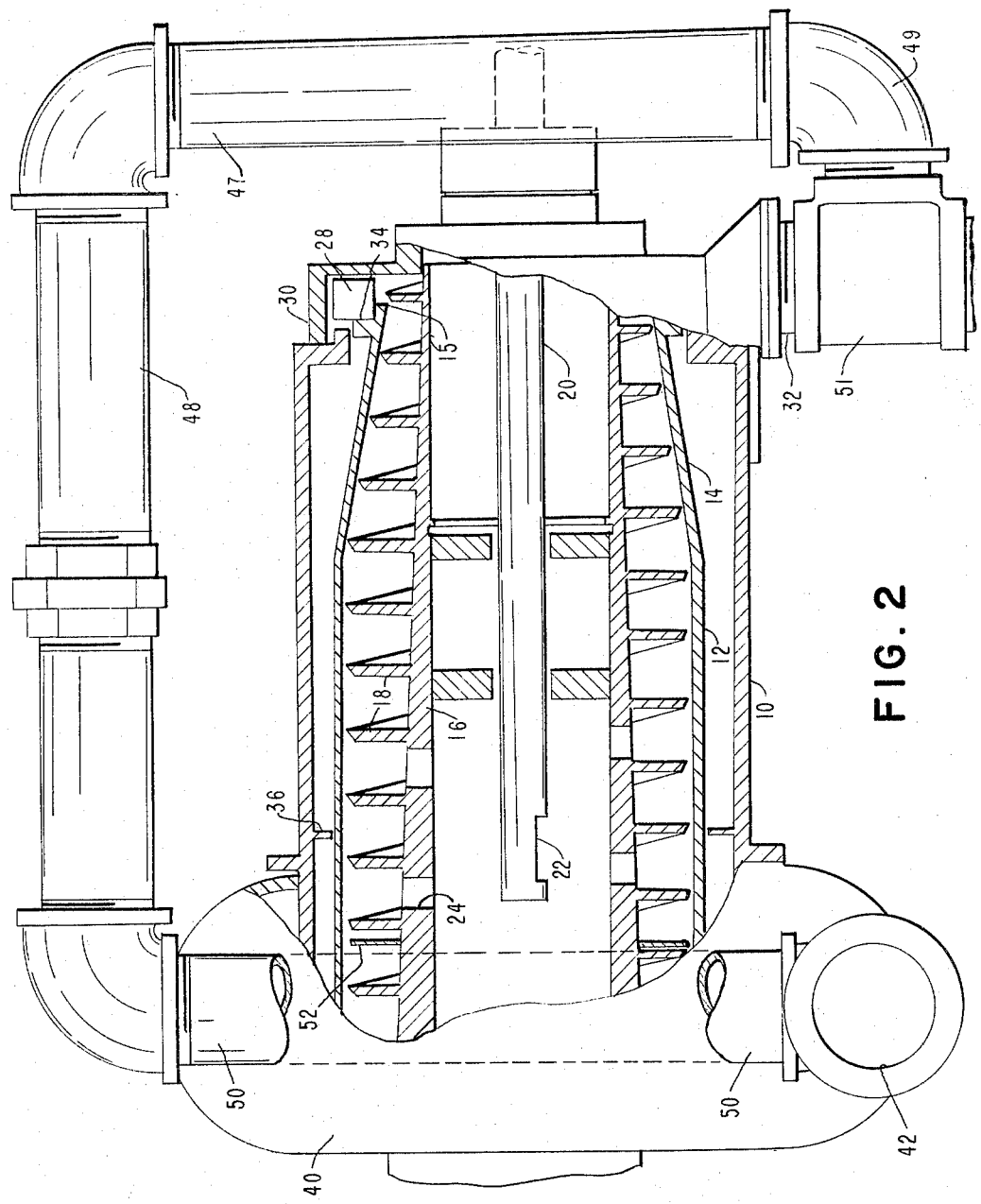
FIG. 2 is a similar side and partial sectional view showing a modified air circulation control arrangement according to the invention.

FIG. 2 of the drawing shows a slight modification of the equipment explained above and in this figure of the drawing the same reference numerals will be used for parts or elements commonly shared with the first form. However, instead of connecting the air circulation pipe to the central casing 10, the form of FIG. 2 uses a venting or air circulation pipe 47 connected in the solids outlet 32 of the housing as by an elbow 49 and T-fitting 51. This arrangement is comparable to that in the first form but under some conditions it is not quite as efficient in keeping finely divided solids separated from the liquid discharge or in preventing spill-over of liquids into the solids. Therefore, and to provide the equipment with means to restore this efficiency, an extra barrier or baffle is provided on the conveyor in the form of an annulus or ring 52 secured to the hollow hub of the conveyor and extending outwardly therefrom radially into close but running engagement with the interior of the bowl. The outer edge of this ring, therefore, will be well below the level of the liquid annulus in the spinning bowl and may be called a "dip" ring. Any solids tending to pass in the air along the conveyor in the direction of the liquid outlet will be forced by the dip ring below the level of the liquid pool in the bowl, the ring therefore acting as a barrier to prevent movement of solids in that direction. The dip ring also acts to prevent or impede flow of moisture-laden air from the liquid toward the solid end.

Figure 4:
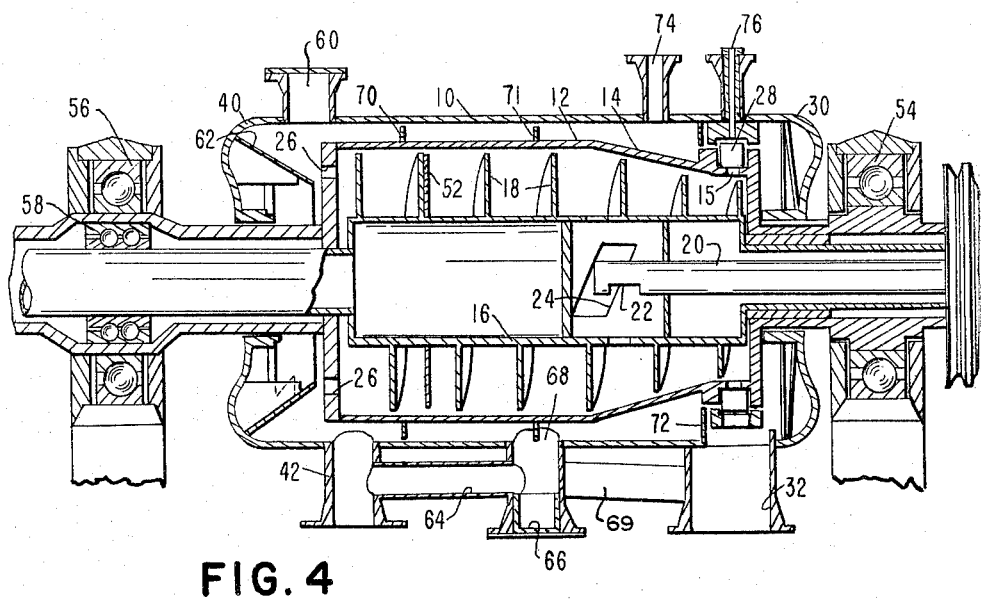
FIG. 4 is a longitudinal sectional view through another form of centrifuge with air circulation control according to a further modification of the invention.

The form of the invention in FIG. 4 is shown in connection with a more sophisticated design of solid bowl centrifugal separator. Again, like parts are given like reference numerals. In this form, bearings 54, 56 and 58 are provided at both ends of the centrifuge for supporting the bowl 12 and the conveyor 16. A hand hole 60 may be provided on the liquid collection chamber for inspection and cleaning of that end of the apparatus and internal deflectors 62 may be provided in the volute at that end. The liquid discharge pipe 42 is in a somewhat different location with respect to the bowl, is directed downwardly instead of horizontally as in the other forms shown, and is connected by a slightly canted pipe 64 to a trap 66 leading as at 68 to the housing or casing near its center. The member 69 extending between the solids outlet 32 and the air recirculation inlet pipe 68 in FIG. 4 is merely a mechanical bracing piece inserted between these parts. This form of the inventiton also uses a series of closely running baffle rings 70, 71 and 72 between the bowl and the outer casing, rings 70 and 71 being fixed to the rotor with clearance from the casing, and 72 being fixed to the casing with clearance from the rotor. The space between the bowl and the casing may be flushed by the introduction of washing liquid through a feed pipe 74 or this pipe may be used to supply an atmosphere of some kind or another to the centrifuge. The solids collection chamber may also be supplied with a cleaning gas or liquid through a similar feed pipe or opening 76.

Although the form of centrifuge shown in FIG. 4 introduces air for recirculation to a point at 68 about midway of the length of the rotating bowl, and in that respect is somewhat similar to the forms shown in FIGS. 1 and 3, this form also includes a dip ring 52 near the liquid discharge end like the corresponding ring shown in the device of FIG. 2.

The venting or air circulation passages, formed by the pipe sections 46, 48 and 50 of FIG. 1, by the pipe sections 47, 48 and 50 of FIG. 2 and by the arrangement of pipe 42, pipe 64 and trap 66 of FIG. 4, in each case constitute a trap for liquid in the air circulation path outside of the housing or casing of the machine.

According to a recent development, solid bowl centrifuges are built wherein the solids and liquids in the slurry are progressed in the same direction concurrently toward a single end of the bowl for discharge after separation. As in the forms here shown, such "concurrent flow" machines have liquid discharge openings arranged at a radius from the rotary axis of the bowl greater than that of the solids discharge opening or openings, but the separate collection chambers with outlets for the liquids and solids are provided in the outer casing near the same end of the machine rather than at opposite ends as here shown. It is intended that the present invention may be applied to such "concurrent flow" centrifugal separators in essentially the same manner as it is applied to the centrifuges here illustrated. This includes provision of a liquid trapping vent pipe outside of the housing and extending from an area of gas or air in the housing, usually at or near the solids collection chamber, to a substantially liquid-free air source area of relatively high pressure at or near the liquid collection chamber.

All forms of centrifuge shown or described here accomplish the desired object of preventing spill-over of liquid or wetting of solids being collected in the solids collection chamber, this being done by venting of a relatively low air pressure portion of the centrifuge to a comparatively high air pressure, substantially liquid-free, portion of the equipment at or near the liquid collection chamber of the centrifuge. The air thus tends to be equal in pressure in the equipment at all points, reducing or preventing unwanted air flow.

Although apparatus according to the invention has been shown and described above as it would operate if the centrifuge solids discharge outlet were sealed or closed, such a showing illustrates only one of the severest operating conditions under which a centrifuge of the invention can function perfectly. It will perform equally well if the centrifuge is completely sealed, either pressurized or unpressurized, if the liquids discharge is directed into a closed tank or piping system, when either the solids or liquids discharge passage is closed or sealed against entry of air, or when there is no sealing of the centrifuge as a whole or closing or blocking of the solids or liquids discharge passages. In other words, the invention does not preclude use of the centrifuge in any normal manner of operation of such apparatus.

The foregoing description should make it clear that certain aspects of this invention are not limited to the particular details set forth as examples, and it is contemplated that various and other modifications and applications of the invention will occur to those skilled in the art. The appended claims therefore are intended to cover such modifications and applications as do not depart from the true spirit and scope of the invention.

What is claimed as new and is desired to be secured by Letters Patent of the United States is:

1. In a centrifuge for the continuous separation of solids and liquids from slurry, comprising
   an outer housing including a central casing portion, a solids collection chamber and solids discharge outlet portion at one end of the casing, and a liquid collection chamber and liquid discharge outlet portion at the other end of the casing,
   a solid-walled bowl mounted for rotation about a central axis in said housing and adapted continuously to receive slurry to be separated, the slurry upon rotation of said bowl forming an annular pool therein,
   a conveyor member mounted within said bowl for concentric rotation therewith at a speed different from the bowl to work solids from the pool of slurry toward a first end of the bowl for discharge therefrom into said solids collection chamber of said housing,
   solids discharge means at that end of the bowl over which solids are conveyed from said bowl to said solids collection chamber and outlet, and
   liquid outlet means at the other end of the bowl, located within the liquid collection chamber of said housing and over which liquid flows from the annular pool in said bowl to said liquid collection chamber and outlet,
   said liquid outlet means being disposed at a larger radius of said bowl than said solids discharge means;
   that improvement comprising
   a gas recirculation pipe,
   said pipe being connected at one end and opening into said liquid outlet outside of the confines of said bowl and near said liquid collection chamber in an area of said outlet substantially liquid-free and open to the pressure of gas in said liquid collection chamber,
   said pipe being connected at its other end and opening into a portion of said housing remote from said liquid collection chamber and outside of the confines of said bowl in an area open to gas pressure in said housing relatively lower than the gas pressure in said liquid collection chamber,
   whereby gas flow in the direction from said liquid collection chamber toward the area of relatively lower pressure in said housing occurs substantially wholly in said recirculation pipe.

2. A centrifuge according to claim 1, said gas recirculation pipe being connected and opening into said housing at said central casing portion near the solids collection chamber end thereof.

3. A centrifuge according to claim 1, said gas recirculation pipe being connected and opening into said housing at said solids discharge outlet portion thereof.

4. A centrifuge according to claim 1, including an annular dip ring on said conveyor member, said dip ring extending from said conveyor into the annular pool of slurry in said bowl to form a barrier against flow of gas internally of said bowl.

5. In a centrifuge for the continuous separation of solids and liquids from slurry, comprising
an outer housing including a central casing portion, a solids collection chamber and solids discharge outlet portion at one end of the casing, and a liquid collection chamber and liquid discharge outlet portion at the other end of the casing,
a solid-walled bowl mounted for rotation about a central axis in said housing and adapted continuously to receive slurry to be separated, the slurry upon rotation of said bowl forming an annular pool therein,
a helical screw conveyor mounted within said bowl for concentric rotation therewith at a speed different from the bowl to work solids from the pool of slurry toward a first end of the bowl located within the solids collection chamber of said housing,
solids discharge means at that end of the bowl over which solids are conveyed by said screws from said bowl to said solids collection chamber and outlet,
liquid outlet means at the other end of the bowl, located within the liquid collection chamber of said housing and over which liquid flows from the annular pool in said bowl to said liquid collection chamber and outlet, said liquid outlet means being disposed at a larger radius of said bowl than said solids discharge means, and
a plurality of spaced apart ring baffle members each extending in and substantially closing the space between the outside of said bowl and the inside of said casing and providing a close running clearance between said bowl and casing;
that improvement comprising
a vent passage outside of said outer housing,
said passage being connected and opening into said liquid outlet outside of the confines of said bowl and near said liquid collection chamber in an area of said outlet substantially liquid-free and open to said liquid collection chamber,
said passage also being connected and opening into a portion of said housing between two said baffle members outside of the confines of said bowl.

6. A centrifuge according to claim 5 in which the connection and opening of said vent passage, into a portion of said housing between two said baffle members, is located adjacent said solids collection chamber.

7. A centrifuge according to claim 5 in which the connection and opening of said vent passage, into a portion of said housing between two said baffle members, is located in said central casing portion, about midway between said liquid collection and solids collection chambers thereof.

8. A centrifuge according to claim 5 including an annular dip ring secured around said screw conveyor near the liquid overflow end of said bowl, the outer edge of said ring extending into the annular pool of slurry in said bowl.

9. In a centrifuge comprising a solid-walled bowl mounted for rotation about a central axis, a conveyor member mounted within the bowl for rotation at a speed different from the bowl to progress solids toward and over a lip at a first end of the bowl, a solids collection chamber surrounding said end of said bowl and in communication therewith, a solids outlet from said chamber for discharge of said solids, a liquid over-flow weir at the second end of the bowl, said weir disposed at a larger radius of said bowl than said solids lip, a liquid collection chamber surrounding said second end of said bowl and in communication therewith, a liquid discharge passage connected to said liquid collection chamber, an outer casing member surrounding the intermediate portion of said bowl and joined at its ends to said chambers, and a plurality of spaced-apart baffle members extending between the outer surface of said bowl and the inside of said casing with close running clearance;
the improvement wherein said solids outlet is adapted for connection to a closed zone from which gas can not be drawn and a vent passage is connected to said casing outside of said bowl between two said baffle members, said vent passage extending to and connected adjacent to said liquid collection chamber outside of said bowl, at a region where the liquid is substantially collected and a substantially liquid-free gas exists above the discharging liquid.

10. In a centrifuge for the continuous separation of solids and liquids from slurry, comprising
an outer enclosing casing, a solids collection chamber and solids outlet portion in the casing, and a separate liquid collection chamber and liquid outlet portion in the casing,
a solid-walled bowl mounted for rotation about a central axis in said casing and adapted continuously to receive slurry to be separated, the slurry upon rotation of said bowl forming an annular pool therein,
a conveyor member mounted within said bowl for concentric rotation therewith at a speed different from the bowl to work solids from the pool of slurry toward a portion of the bowl for discharge therefrom into said solids collection chamber of said casing,
solids discharge means at that portion of the bowl over which solids are conveyed from said bowl to said solids collection chamber and outlet, and
liquid discharge means in the bowl, located within the liquid collection chamber of said casing and over which liquid flows from the annular pool in said bowl to said liquid collection chamber and outlet, said liquid discharge means being disposed at a larger radius of said bowl than said solids discharge means;
that improvement comprising
a gas vent pipe,
said pipe being connected at one end and opening into said casing outside of said bowl in an area of gas substantially liquid-free and open to pressure in said liquid collection chamber,
said pipe being connected at its other end and opening into said casing outside of said bowl at a point spaced from said liquid collection chamber in an area of gas pressure in said casing relatively lower than the pressure in said liquid collection chamber,
whereby gas flow from said liquid collection chamber toward the area of relatively lower pressure in said casing occurs substantially wholly in said vent pipe.

11. A centrifuge according to claim 10, said gas vent pipe including means adapted to trap liquid from gas passing therethrough.

References Cited by the Examiner
UNITED STATES PATENTS

| | | | |
|---|---|---|---|
| 1,321,288 | 11/1919 | Dalzell | 233—11 |
| 1,999,712 | 4/1935 | Zorn et al. | |
| 2,778,566 | 1/1957 | Garrett | 233—11 |
| 2,795,635 | 6/1957 | McBride. | |
| 2,870,912 | 1/1959 | Mathieu | 210—213 |
| 3,096,282 | 7/1963 | Trotter | 233—7 |

M. CARY NELSON, *Primary Examiner.*

HENRY T. KLINKSIEK, *Examiner.*